Patented Mar. 20, 1951

2,545,832

UNITED STATES PATENT OFFICE 2,545,832

METHOD FOR MANUFACTURING LAMINATED ARTICLES

John K. Wagers, Berkeley, and Edward C. Shokal, Oakland, Calif., assignors to Shell Development Company, San Francisco, Calif., a corporation of Delaware No Drawing. Application August 27, 1945, Serial No. 613,028

2 Claims. (Cl. 154—140)

This invention relates to a method for manufacturing laminated articles. More particularly, the invention pertains to a method for producing laminates having a plurality of plies of sheet material embedded in a thermo-set resin, the procedure of the method providing laminates with a surface having a "super-finish" so the laminates possess superior glossiness, water-resistance and wearing qualities.

Laminates have been prepared heretofore by immersing and impregnating various sheet materials like woven fabrics or paper in liquid resin-forming substances, superimposing two or more layers of the impregnated sheets and curing the resin of the assembled laminate between platens by application of heat and pressure. Owing to the inner core of woven fabric or paper, the laminates have markedly superior strength as compared to that of the cured resin without the laminae therein. In producing the laminates in this manner various thermo-setting resins have been used like the phenolics (Bakelites or phenol-formaldehyde resins), the ureas (urea-formaldehyde resins) and the melamines (melamine-formaldehyde resins), which materials require high platen pressures of 500 to 2000 p. s. i. (pounds per square inch) for curing. In recent years, other thermo-setting materials have been developed such as certain allyl esters, glycol dimethacrylate and the like, which permit low platen pressures to be used in the curing thereof.

During the curing of the resin, in the manufacture of laminates, the platen presses down on the woven fabric or paper and tends to squeeze out the resin before it sets so that the finished laminate has only an extremely thin coating of cured resin between the fabric or paper and the surface of the laminate. This results in the laminate being insufficiently protected against abrasion. Also, the resistance of the laminate toward contact with water and other liquids is lacking and out of proportion to resistance of the resin itself. Furthermore, the laminate often has a rough and uneven surface.

It was attempted to produce laminates with thicker outer coatings of resin by procedures suggested in the prior art, but these did not prove successful. Thus, upon taking a cured laminate prepared in the above-described conventional manner and applying additional resin-forming material to its surface with subsequent curing between press platens, a protective coating of desired thickness can be obtained. However, it was found that the outer layer of resin tended to separate from the resin surface of the first formed laminate. Since application of additional resin-forming material to a pre-cured laminate produced a finished laminate which was unsatisfactory because of the tendency of the second coating to separate, it was quite surprising and unexpected that a thick coated laminate could be obtained by coating the surface of the platen with resin-forming material, partially curing the applied coating, assembling layers of woven fabric or paper which had been impregnated with resin-forming material between the coated platens, and then completing the curing of the resin-forming material of the laminate.

The laminates prepared by this method of the invention have qualities not possessed by laminates produced according to conventional methods available heretofore. The method has particular application in overcoming defects encountered in making laminates from the newer resin-forming materials like the allyl esters which can be cured at the decidedly lower pressures than those needed with the older materials like the phenolics, ureas and melamines. The use of low-curing pressures, made possible with the allyl esters, is of great advantage in that the expense of high-pressure presses is avoided. When laminates are made from woven fabrics and an allyl ester by impregnating the fabric with the ester, followed by curing between pressed platens in the conventional manner, except that low pressures are used, the finished laminate was found to have a rough and uneven surface. This is caused by the large shrinkage which the allyl esters undergo on curing. Thus, diallyl phthalate, a typical ester of this type, decreases in volume about 12 to 14% on being polymerized from monomer to final, infusible polymer. Even though a smooth-surfaced platen like plate glass is used, the cured laminate has a rough surface. While in curing the assembled laminate, the allyl ester wets and covers the entire smooth contacting surface of the platen before curing begins, the polymerizing allyl ester separates away from the platen during the curing because of shrinkage in the regions between the outermost threads of the fabric which are known as "raisers" in the textile art, and because the platen pressure is not sufficient to keep the platen surface squeezed down onto the shrinking resin. Only in the immediate vicinity of the raisers does the curing allyl resin continue to contact the surface of the platen, with the result that the cured laminate has valleys between the raisers owing to shrinkage from the platen surface whereby a rough finish and lack of glossiness is obtained. This unevenness of surface is encountered at platen pressures up to about 25 p. s. i. and makes the use of "contact pressures" of 1 to 3 p. s. i., which are so advantageous with the new resins, impossible because the laminates produced at such pressures have unsatisfactory surfaces. Furthermore, the laminate lacks water-resistance because myriads of fibers of the threads of the bibulous fabrics project through and onto the surface of the laminate. Upon the principal surface of the laminate being wet with water or other liquids, the water travels into the inner core of fabric apparently by capillary action through the individual fibers projecting onto the surface with the result that the inner fabric acquires a spotted appearance owing to water being absorbed into it. When severe absorption occurs, the fabric actually swells and projection of the swelling extends to the surface where it causes further roughness. For these reasons the laminate has poor resistance to contact with liquids even though the resin per se does not absorb water to any appreciable extent. We have also found that laminates of paper made in the conventional manner have even less resistance toward contact with water than do those prepared from cloth fabrics. Paper is of fibrous character and in order to obtain a laminate thereof having resistance to contact with liquids, it is necessary that the fibers of the paper be sealed in resin so they do not protrude onto the surface of the laminate. Furthermore, it was found that paper laminates made by prior methods using allyl esters as resin-forming material stick and adhere to metallic platens after curing the resin even though they are smooth surfaced and extremely clean, and the platen cannot be separated from the cured laminate without great difficulty which usually results in the laminate being damaged and thus rendered useless. Although glass platens avoid this difficulty with sticking, glass is of such a fragile character its use in commercial production of laminates is not feasible.

These defects of prior art laminates are effectively overcome by the method and products of the present invention. The invention provides a means whereby a protective layer of the resin intervenes between the fibers of the fabric or paper and the outer surface of the laminate, which surface comes into contact with liquids. The fibers are thus sealed from the outer surface and seepage of water or other liquids through the fibers into the core of the laminate is effectively prevented. Nevertheless, the method of the invention enables the protective resin layer to form an integral part of the entire resin mass of the laminate and no weakness or tendency of it to separate is present.

The method of the invention is peculiarly suitable when platen pressures below 25 p. s. i. are used since, as was noted, the conventional method of production at such low pressures gives laminates with rough surfaces in addition to having poor resistance toward contact with liquids. While the invention method enables smooth surfaced laminates to be produced, which was not possible with prior methods, the method of the invention can also be used at higher pressures and, in some cases, it may be desirable to employ platen pressures up to 150 or 200 p. s. i. In general, the laminates of the invention are characterized by having excellent glossy surfaces which have extremely good resistance toward contact with water and other liquids.

The laminates produced in accordance with the invention have the reinforcing laminae therein of any suitable fibrous, bibulous material. The use of large size laminates as in house construction or furniture manufacture, for example, necessitates the use of a very cheap material for the laminae and for this purpose such materials as cotton fabrics or paper are used. However, other bibulous sheet materials can be used such as woven textile fabrics made from vegetable fibers such as those of linen, hemp, jute, sisal, kapok, ramie, etc., or from animal fibers such as wool, horse hair, alpaca, rabbit fur, silk, etc. If desired, the sheet material can be of woven fabrics from inorganic fibers like those from glass or synthetic fibers which may be derived from natural proteins of animal origin, e. g. casein or a vegetable origin, e. g. soya bean meal or from cellulose as in the case of fibers of regenerated cellulose, rayon, cupro-ammonium viscouse, cellulose acetate, cellulose acetobutyrate, etc. Other woven fabrics can be used like those from the linear polyamides (nylons) or interpolymers of vinyl halides with vinyl esters, e. g. Vinyon, or polybutadiene, or the silicones. The weave of the fabrics can be of any suitable type such as duck, twill, broken twill, broadcloth, filling twill, steep twill, honeycomb, crêpe, satin, crowfoot satin, corkscrew satin, etc. Instead of woven fabrics, the bibulous material may be in sheet form of which papers like kraft, rag, alpha-cellulose, Mitscherlich, linen, etc., are suitable.

The resinous component of the laminates is derived from resin-forming materials which are thermo-setting in character. They can be organic oxygen compounds which contain two or more polymerizable groups, preferably those in which one of the groups is the polymerizable group

and is separated from the other polymerizable group or groups by an intervening atom or atoms so the polymerizable groups are unconjugated with respect to carbon. Such compounds polymerize by carbon-to-carbon bonding through the polymerizable group, and the polymers formed, dependent upon the extent of polymerization, differ in properties and characteristics. For example, diallyl phthalate when polymerized, first forms a soluble polymer which is soluble in a variety of organic solvents including the monomeric diallyl phthalate. This soluble polymer on further polymerization changes to a fusible gel which is insoluble in the organic solvents and the monomeric ester. The fusible gel polymer is characterized by being capable of fusing, especially upon application of pressure, and consequently, the gel polymer is capable of being molded. Further polymerization of the gel converts it into the final form which is the infusible polymer. The infusible polymer cannot be fused and shaped in a mold even under pressure, and like the gel form it is insoluble. All of the compounds of the above defined class have in common these same characteristics of polymer or resin formation and are consequently known as thermo-setting resins because of ability to be converted to insoluble, infusible polymers. Among representative members of the class are compounds like vinyl, allyl, isopropenyl, methallyl, ethallyl, crotyl, methyl vinyl carbinyl, cinnamyl, oleyl or propargyl esters of polycarboxylic acids such as diallyl oxalate, diallyl succinate, diallyl adipate, diallyl maleate, diallyl phthalate, di- or triallyl citrate, diallyl itaconate, dimethallyl phthalate, dicrotyl glutarate, diallyl diglycolate, divinyl adipate, diallyl carbonate, etc.; as well as mixed esters like allyl vinyl phthalate, allyl methallyl phthalate, methallyl crotyl adipate, vinyl cinnamyl sulfolanyl diglycolate, etc.; or esters with monocarboxylic acids, which acids contain one polymerizable group such as allyl acrylate, allyl methacrylate, methallyl crotonate, allyl oleate, allyl propiolate, vinyl methacrylate, allyl cinnamate, etc. Other compounds include ethers containing multiple olefinic unsaturation such as diallyl ether, allyl methallyl ether, vinyl oleyl ether, as well as polyethers of polyhydric alcohols such as di- or tri-allyl, methallyl, crotyl, cinnamyl ethers of ethylene, propylene or trimethylene glycol, or glycerol, methylglycerol or diglycerol, etc., as well as polymerizable unsaturated esters of the polyhydric alcohols such as glycol diacrylate, glycol dimethacrylate, diethylene glycol dimethacrylate, glycol dipropiolate, glycerol di- or trichloracrylate, propylene glycol dicinnamate, polyethylene glycol diacrylate, sorbitol hexamethacrylate, and similar compounds containing two or more aliphatic unsaturated polymerizable groups. If desired, mixtures of two or more resin-forming compounds can be used.

The unsaturated polymerizable compounds are polymerized with the aid of heat alone, or preferably, with heat in combination with a polymerization catalyst such as benzoyl peroxide, acetyl peroxide, benzoyl acetyl peroxide, lauryl peroxide, dibutyl peroxide, succinyl peroxide, sodium peroxide, barium peroxide; tertiary alkyl hydroperoxide such as tertiary butyl hydroperoxide; ditertiary alkyl peroxide such as ditertiary butyl peroxide, tertiary butyl benzoyl peroxide, peracetic acid, perphthalic acid, perborates, percarbonates, persulfates, air, oxygen, ozone, etc.

In executing the method of the invention, the resin-forming material is first applied to the principal or contacting surface of the platen, and the applied material is then partially cured or polymerized to just sufficient extent that a fusible resin or polymer is formed which is non-flowable at 20° C. The platen can be coated with resin-forming material as its monomer, soluble polymer, solution of soluble polymer in monomer, or soluble polymer in a suitable solvent. Coating with monomer alone is least preferred owing to the difficulty of handling mobile liquid material on a flat platen when the monomer is converted to the non-flowable polymer. The use of soluble polymer in some form is the most practicable method of applying the coating to the surface of the platen.

The soluble polymer is obtained by partially polymerizing the unsaturated polymerizable compounds. By merely heating the compounds or by heating a mixture containing about 0.1% or less of polymerization catalyst, the soluble polymer is produced. If the heating is continued for too long a time the insoluble gel is formed. Since this gel form of polymer is not suitable for coating the platens, the polymerization is interrupted by discontinuing heating before the gel polymer is formed. As the compound polymerizes, the percentage of monomer decreases and the percentage of soluble polymer increases. The course of the polymerization is conveniently followed by observing the refractive index from time to time. An increase in polymer content is accompanied by increase in refractive index because the soluble polymer always has a higher refractive index than that of the monomer. Since the soluble polymer remains in solution as it forms with the monomer, the course of the polymerization can be followed by observation of increase of refractive index of the polymerizing mass. When the insoluble polymer first forms, the mixture gels and it is no longer a solution. By making an experimental polymerization with a particular compound and noting the refractive index of the solution at the gel point, the polymerization can be so conducted subsequently with additional material, that the formation of the insoluble gel is avoided. In practice it is customary to allow a margin of safety so as to avoid over-polymerizing to the gel point, especially since the gel point will vary slightly with different batches of the compound being polymerized. It is therefore usual to interrupt the polymerization about 0.0025 to 0.0075 unit of refractive index $n_D^{20}$ short of the predetermined value at which gelation occurs.

Temperatures of from about 50 to 250° C. or higher are suitable for producing the soluble polymer. Optimum temperatures will vary with particular compounds being polymerized. With diallyl phthalate, for example, temperatures of from 200 to 225° C. are preferred. Heating alone can be used to effect the polymerization, but it is usually desirable to employ a catalyst. Excellent results are obtained with about 0.1% of tertiary butyl hydroperoxide.

The soluble polymer can be obtained in either batchwise or a continuous manner. Thus a quantity of the polymerizable compound with or without catalyst can be heated in a suitable vessel, preferably in an inert gas atmosphere such as nitrogen or carbon dioxide, until the desired degree of polymerization has been obtained. If desired, the polymerization can be effected by pumping the compound through a heated tubular reactor, the rate of flow being regulated so that the effluent solution of soluble polymer in monomer has reached the desired degree of polymerization.

When the compound is polymerized in bulk, as described above, the amount of soluble polymer which can be obtained without having the insoluble gel polymer form, is limited. Thus, with diallyl phthalate the limiting amount of soluble polymer which can be formed from the monomer is about 25%. The platen can be coated with such a solution which is a viscous liquid but it is usually desirable to use a more concentrated solution of the polymer which does not have such a large portion of monomer therewith. The soluble polymer can be obtained from the solution in monomer by vacuum distillation at low temperatures not much above room temperature, or by adding a non-solvent for the polymer to the solution such as methyl or ethyl alcohol, whereby the soluble polymer precipitates from the solution.

A more effective method of obtaining the soluble polymer is to polymerize the compound in solution with about an equal-weight of a suitable solvent. In this manner, substantially all of the monomer can be converted to polymer and the danger of having gellation occur while attempting to obtain maximum amounts of soluble polymer from monomer are greatly lessened.

Various solvents can be used to obtain the soluble polymer by polymerization in solution. Aromatic solvents like benzene, toluene, xylene, ethyl benzene, triethyl benzene, diisopropyl benzene, chlorobenzene, and the like, give excellent results. By effecting the polymerization under pressure, temperatures above the boiling point of the particular solvents can be used. When the polymerizable compounds are polymerized in solution it is preferred to employ about 1 to 5% of peroxide catalyst to increase the rate of polymerization. By using temperatures between about 150 and 225° C., substantially all of the compounds can be converted into soluble polymer. Nevertheless, while polymerization in solvents permits a much larger proportion of the polymerizable compound to be converted to soluble polymer, the danger of the soluble polymer passing to the insoluble gel is not prevented. The course of the polymerization can be followed by observation of increase of refractive index as in polymerizing the compound in bulk. The polymerization can be interrupted before gel formation occurs on the basis of an experimental predetermination.

The resin-forming material is applied to the principal or contacting surface of the press platen used in making the laminated articles. The mixtures of monomer and soluble polymer are ordinarily very viscous liquids which can be smeared onto the solid surface and levelled off with the aid of a doctor blade. A spray method might be used, particularly at a raised temperature. In this manner the solid surface of the platen is coated with a film of the resin-forming material.

Another and more preferred method is to spray or brush a solution onto the platen surface. The soluble polymer is used in a solution which is sufficiently fluid and mobile to be sprayed or brushed. Various volatile organic solvents for the soluble polymer can be used for this purpose such as aromatic hydrocarbons like benzene, toluene, xylene, as well as nitropropane, ethylene dichloride, chloroform, dichlorethyl ether, cyclohexenone, isophorone, acetone, methyl ethyl ketone, acetonyl acetone, mesityl oxide, and the like. A mixture containing about 25 to 35% soluble polymer in the volatile solvents gives a solution of suitable viscosity and consistency for spraying the coating onto the platen surface.

In order to obtain the desired thickness of protective coating on the laminated article, a coating of substantial thickness is applied on the platen surface, i. e. from 0.002 to 0.008 inch. Excellent results are obtained with a coating of about 0.004 inch thickness.

The platen used in making the laminates preferably has a smooth polished surface. If desired, the surface can be embossed. Various materials are suitable for use as platens in producing the laminates. Excellent results are obtained with glass, fused enamel on steel, and stainless steel such as KA2. Other platen materials which give good results are aluminum, chromium or nickel plated steel, clock spring steel, and polished cold-rolled steel. When the platens are clean, no difficulty is encountered in separating the finished laminate from the platens. Polishing with talc or pumice is helpful in obtaining a clean surface for use in making the laminates. While the invention primarily contemplates the production of flat laminates by use of flat platens, curved, corrugated, or other shapes of platen surfaces can be used, if desired.

The resin-forming material applied to the solid surface preferably contains about 1 to 10% of polymerization catalyst to aid in converting the material to the fusible resin or polymer which is non-flowable at 20° C. The applied resin-forming material is partially cured or polymerized by heating at 100 to 150° C. for a short time, such as 10 to 30 minutes. This treatment sets up the soluble polymer so that the resin coating on the platen is of proper consistency for assembly of the laminate. The curing of the coating is not carried beyond a limited point. It is essential that the polymer of the coating remain in the fusible stage and not be converted into the final infusible form because if this happens, the final laminate will not have the surface layer properly bonded to the inner core of the fabric or paper. Nevertheless, the curing must progress sufficiently far so that the pressure applied in the final curing of the laminate will not squeeze out the coating applied to the platen when the platen presses down on the outer surface of the laminae. The partial curing is effected so that the polymer is still fusible and is at least non-flowable at 20° C. By non-flowable is meant that the polymer has sufficient consistency so that it is not able to flow by its own weight at this temperature. Excellent results are obtained when the major proportion has been converted to the fusible gel form of polymer. At this stage the coating is not free flowing and has substantially no tackiness at ordinary temperatures. The platens having thereon the partially cured resin can be stacked and stored until ready for use in making the laminated articles.

When the coating is applied to the platens in the form of a solution of the polymer, the solvent in the applied coating is ordinarily permitted to evaporate before subjecting the platen to the partial curing treatment. The solvent evaporation can be accomplished by air-drying the coating platen or, if desired, in combination with the partial curing of the coating to the non-flowable polymer.

After the platens coated with the partially cured polymer have been prepared, they are used in making laminated articles. Sheets of the fibrous material can be impregnated individually with resin-forming material and then superimposed to form the laminate, or unimpregnated sheets can be first superimposed and then impregnated. In either case, one or both of the principal surfaces of the laminated assembly are contacted with a platen coated with partially cured polymer and the resin-forming material in the assembly is cured to the final infusible state. When two coated platens are used, the finished laminate has a protective layer or both principal surfaces and both sides of the laminate are water-resistant. In some uses of the laminated articles, it is not necessary to have a water-resistant surface on both sides and consequently only one coated platen is used, the other surface being formed in the conventional manner with the platen having no preformed coating thereon. This latter embodiment of the invention is particularly useful when the laminate is formed using the inflated bag technique according to which a coated platen or form is used and impregnated fibrous material is placed in contact therewith. The curing of the laminated article is then effected by heating while holding the laminate to the form with the inflated rubber bag. Only the side of the laminate contacting the coated platen or form has a protective layer thereon.

The sheets of fibrous material are impregnated by submersion in liquid resin-forming material which can be either the monomer of the compound containing two or more polymerizable groups, or a solution of the soluble polymer thereof. Preferably, a solution of soluble polymer in monomer is used. To aid in curing the resin-forming material to the infusible polymer, the resin-forming material has incorporated therewith 1 to 10% of a polymerization catalyst. Impregnation is effected by dipping the sheets of fibrous material into the liquid resin-forming material, removing the sheets, and, if desired, freeing them from excess liquid, which latter step is conveniently accomplished by use of a doctor blade or by wringing between suitably spaced rolls. In most cases, it is unnecessary and even undesirable to remove any liquid remaining in the fibrous material after the dipping.

Another procedure consists of placing a quantity of the resin-forming material in a container and first submerging the lower platen. The sheets of fibrous material are then submerged and stacked on the lower platen beneath the surface of the liquid. The upper platen is then put in place and the whole assembly is lifted out of the liquid whereby it is ready for final curing. Impregnation and assembly are thus performed in one operation.

In all cases, the assembly is made with care so that air bubbles are not trapped between the layers of fibrous material or between the laminate and platen whether it be coated or not.

After the laminate has been assembled, it is heated so as to cure the resin-forming material to the final polymer. The heating can be effected in any suitable manner. Thus the assembled laminate with the platens in place can be put in an oven wherein heated air is circulated. Another method is to apply the heat through the platens by use of electricity, heated oil, or steam, in the usual fashion. These methods are suitable for curing laminates up to about one-half inch thick. Heavier laminates, as well as the lighter, if desired, can be cured by high-frequency electrical induction heating. Heating by infra-red radiation can also be used.

The optimum temperature and time of heating in the final curing stage will depend on a number of factors such as the particular polymerizable compound employed, the thickness of the laminate, the particular catalyst employed, etc. The temperature need only be sufficiently high so that a feasible rate of polymerization occurs but should not be so high that decomposition and degradation of the laminates take place. In general, temperatures between about 50 and 200° C. are suitable. With the allyl esters temperatures of 75 to 125° C. are used and excellent results are obtained when diallyl phthalate is employed at between 90 and 115° C. While a single temperature can be used during the final curing operation, the use of gradually increasing temperatures produces harder polymers. Thus, the curing can start at say 90° C. and gradually increase to 115° C., during 30 minutes to 1 hour and then the curing is completed at the latter temperature.

The pressure at which the curing is effected is preferably kept low. Even though the contact pressure between the platen is less than 25 p. s. i., the finished laminates will have smooth water-resistant surfaces characteristic of the method of the invention. Pressures between 5 p. s. i. and substantially no pressures, e. g. 1 p. s. i., give the desired smooth-surfaced laminates which were impossible to obtain with the prior conventional methods of producing laminates.

In executing the method of the invention, it is customary to use the same resin-forming material both for impregnating the laminae as well as for coating the platen although they may be in somewhat different degrees of resin formation. The laminate resulting from such practice has the resin constituent thereof as a single material.

In some cases, it is desirable to use different thermo-setting resin-forming materials for impregnating the laminae and for coating the platen. This procedure permits more expensive resin-forming materials which have special properties to be used for coating the platen while the impregnating resin which forms the bulk of the laminate resin to be a cheaper material. Since the method of the invention involves the contacting between the coated platen and the impregnated laminae with the resin-forming material of each in only a partially cured condition and then curing entire whole in a single operation, an excellent bond between quite dissimilar materials can be obtained.

The method of the invention is illustrated in greater detail by the following examples.

*Example I*

Diallyl phthalate containing about 0.1% of tertiary butyl hydroperoxide was polymerized by flowing it through a heated glass tube. The temperature of polymerization was 220° C. and the rate of flow was regulated so the rise in refractive index (20/D) was about 0.0130. This gave a partial polymer solution of soluble polymer in unpolymerized monomer which was very viscous at room temperature and contained about 24% polymer.

About 5% benzoyl peroxide was dissolved in the polymer solution and it was spread on the contact surface of stainless steel platens which were heated to about 125° C. Excess polymer was drained off leaving a smooth film on the surface of the platens. The coated platens were then heated at 120–130° C. for 10 minutes whereby the coating was partially polymerized to form a slightly tacky fusible polymer surface which was non-flowable at room temperature (20° C.)

Some of the partial polymer solution was vacuum distilled at 0.5 mm. pressure so as to raise the content of polymer to about 80%. This solution was then diluted to make a 50% solution in toluene and plies of cotton duck were impregnated with the solution. The solvent was evaporated from the cloth.

The laminate was assembled by superimposing 8 layers of the impregnated cloth between two of the coated platens. A contact pressure of about 1 p. s. i. was applied and the resin-forming mass of the assembly was polymerized or cured to the infusible polymer by heating 30 minutes at 90° C., 30 minutes while the temperature was gradually raised from 90° C. to 115° C. and then 1 hour at 115° C.

The laminate produced in this manner had a smooth surface, free from defects and no apparent absorption of water when a principal surface was contacted continuously for two days.

*Example II*

Diallyl phthalate was polymerized in solution with an equal weight of toluene by heating for two hours at 180 to 220° C. under 170 to 200 lbs. pressure. About 2% of benzoyl peroxide was then added to the solution and heating was continued at 65° C. for ten hours whereby the viscosity of the polymer solution was increased to about V to W on the Gardner scale. A solution suitable for spraying was prepared by adding to 100 parts by weight of the polymer-containing solution, about 41.4 parts of xylene, 16.4 parts of methyl isobutyl ketone and 14.6 parts of 1-nitropropane. This solution of soluble polymer of diallyl phthalate was sprayed onto the contacting surface of flat steel platens which were air dried to evaporate the solvent and then heated at 130° C. for 10 minutes to form a smooth coating of fusible polymer which was relatively hard and non-tacky.

Decorative laminates were prepared with outer layers of printed paper or printed cloth and 6 plies of cotton duck between the decorative layers. The laminates were assembled by submersing a coated platen in a solution of about 25% soluble polymer in monomeric diallyl phthalate containing 4% benzoyl peroxide. The cloth and paper sheeting was first dried at 100° C. for one-half hour and then superimposed by submersion in the polymer solution, care being taken to eliminate air bubbles. A precoated platen was placed on top of the submerged laminae and the assembly was removed from the polymer solution. The laminates were cured in an oven wherein hot air was circulated according to the following schedule: 2½ hours at 85° C. including the time to reach that temperature (about ½ hour); then the temperature was increased to 100° C. and held at that temperature for ½ hour after which the temperature was gradually increased to 115° C. during ½ hour and the curing was finished in another ½ hour at 115° C.

The superior water-resistance of laminates prepared according to the method of the invention in direct comparison to laminates obtained in conventional fashion, are evident from the results given in the following table. Diallyl phthalate was used as resin-forming material in all cases and the laminates were produced using stainless steel platens substantially in accordance with the directions given in Example II with the exception that the laminates using the conventional manner were prepared by not precoating the platens with partially cured fusible polymer; rather these laminates were obtained by assembling with clean, uncoated platens. All of the laminates were flat and about one quarter inch thick. They were made with an inner core of 6 plies of cotton duck and had the outermost ply of the materials noted in the table.

To determine water-resistance the laminates were subjected to two tests. One, denoted as the Teapot test, was performed in the following manner: A metal can of about one-quarter pint with a ridged bottom was filled with water which was brought to a boil. A small pool of water was put on the surface to be tested and the hot can was placed over it. The can was allowed to remain for 15 minutes and then removed. The spot covered by the can was then examined visually and the appearance of the surface was noted.

The Water Contact test was performed by placing a piece of absorbent cotton which had been soaked in water on the surface of the laminate. The cotton was covered with an inverted glass vessel to prevent evaporation. The wet cotton was removed at intervals and the laminate surface dried to permit visual examination of any change that had occurred by the contact with water. Deterioration caused by absorption of water was readily visible from the comparative appearance of adjoining portions of the laminate which had not been wet by the water. When the amount of absorption was small, only a visible change was present while when absorption was large, the surface became roughened owing to the swelling action of the absorbed water.

| Outer Ply | Platen Coating | Thickness of Partially Cured Coating on Platen | Teapot Test | Water Contact Test | | | |
|---|---|---|---|---|---|---|---|
| | | | | 4 hrs. | 24 hrs. | 3 days | 10 days |
| Cotton Muslin | No | Inches None | No change | | Dark ring | Badly darkened | Badly darkened. |
| Cotton Army Duck | No | None | ----do---- | | ----do---- | ----do---- | Do. |
| Dyed Heavy Cotton Duck | Yes | 0.0037 | ----do---- | | No change | No change | No change. |
| Paper (printed and pigmented) | No | None | Surface roughened and gloss reduced. | Surface roughened and gloss reduced. | Surface badly roughened. | Surface badly roughened. | Surface badly roughened. |
| Do | Yes | 0.0022 | No change | ----do---- | No change | No change | No change. |
| Do | Yes | 0.0057 | ----do---- | ----do---- | ----do---- | ----do---- | Do. |
| Munising Paper (wood pulp) | No | None | Surface roughened and gloss reduced. | Surface roughened and gloss reduced. | Surface badly roughened and whitened. | Surface badly roughened and warped. | Surface badly roughened and warped. |
| Do | Yes | 0.004 | No change | No change | No change | No change | No change. |

The foregoing table demonstrates the outstanding water-resistance of the laminates produced by the method of the invention. In addition the laminates have an attractive glass-like surface and because of the substantial thickness of resin between the outer surface and the inner core of fibrous material, they have extremely good abrasion resistance and wearing qualities. The excellent water-resistance is obtained because of the structure of the laminate which is made possible by the method of manufacture. The laminates are characterized by having a substantial thickness of resin intervening between the outer or principal surface and the individual fibers. The fibers are consequently unable to project through and onto the outer surface. They are sealed in by the intervening resin layer. Nevertheless, the method of manufacture makes the resin constituent of the laminate an integral and inseparable whole with the result that the laminates have as good, if not better, properties of physical strength than laminates made by other methods.

Extremely attractive decorative laminates can be made using transparent resin and an outer laminae or ply having a printed design thereon. These are useful in many applications such as book covers, card tables, desk tops, screens, and other furniture.

The method of the invention permits manufacture of laminates having intricate designs and lettering thereon by the use of pigmented resin-forming materials. Thus, a stencil of appropriate design can be placed on a platen and the resin-forming material containing pigment of desired color is sprayed thereon. The stencil is removed and the uncoated portions of the platen sprayed with additional resin-forming material containing a different colored material. After partially curing the coating the platens can be used to produce the laminates which will have the desired design directly in the resin surface.

We claim as our invention:

1. In the production of a laminate from sheets of water-absorptive cellulosic fibers and polymer of a diallyl ester of a dicarboxylic acid, the improvement which comprises, in combination, the steps of: (1) impregnating a plurality of sheets of said water-absorptive cellulosic fiber in a solution of said polymer and a peroxide polymerization catalyst; (2) superimposing a plurality of the thus impregnated sheets to form an uncured laminate; (3) forming a film of said polymer and peroxide polymerization catalyst on a smooth metal surface; (4) subjecting said film to a temperature of 100° C. to 150° C. for a limited time between 10 and 30 minutes to partially polymerize the film to a fusible polymer which is tacky to hard at 20° C.; (5) placing the partially polymerized film while still attached to said metal surface upon the surface of the above-said cured laminate; (6) subjecting the laminate and the partially polymerized film on said metal surface to a temperature between 75° C. and 125° C. while under a pressure of from about 1 to 200 pounds per square inch for a time sufficient to convert the polymer in the laminate to an infusible polymer; (7) separating the resulting laminate from said metal surface.

2. In the production of a laminate from sheets of water-absorptive cellulosic fibers and polymer of diallyl phthalate the improvement which comprises, in combination, the steps of: (1) impregnating a plurality of sheets of said water-absorptive cellulosic fiber in a solution of diallyl phthalate polymer and a peroxide polymerization catalyst; (2) superimposing a plurality of the thus impregnated sheets to form an uncured laminate; (3) forming a film of said diallyl phthalate polymer and peroxide polymerization catalyst on a smooth metal surface; (4) subjecting said film to a temperature of 100° C. to 150° C. for a limited time between 10 and 30 minutes to partially polymerize the film to a fusible polymer which is tacky to hard at 20° C.; (5) placing the partially polymerized film while still attached to said metal surface upon the surface of the above-said uncured laminate; (6) subjecting the laminate and the partially polymerized film on said metal surface to a temperature between 75° C. and 125° C. while under a pressure of from about 1 to 200 pounds per square inch for a time sufficient to convert the diallyl phthalate polymer in the laminate to an infusible polymer; (7) separating the resulting laminate from said metal surface.

JOHN K. WAGERS.
EDWARD C. SHOKAL.

REFERENCES CITED

The following references are of record in the file of this patent:

UNITED STATES PATENTS

| Number | Name | Date |
| --- | --- | --- |
| 2,010,857 | Hanson | Aug. 13, 1935 |
| 2,070,600 | Jenett | Feb. 16, 1937 |
| 2,221,663 | Rothrock | Nov. 12, 1940 |
| 2,314,701 | Harvey | Mar. 23, 1943 |
| 2,320,533 | Muskat | June 1, 1943 |
| 2,339,058 | D'Alelio | Jan. 11, 1944 |
| 2,370,562 | Meunier | Feb. 27, 1945 |
| 2,384,119 | Muskat | Sept. 4, 1945 |
| 2,433,047 | Hayes | Dec. 23, 1947 |
| 2,433,965 | Upson | Jan. 6, 1948 |
| 2,443,736 | Kropa | June 22, 1948 |
| 2,443,739 | Kropa | June 22, 1948 |